March 18, 1930.    O. A. FREDERICKSON    1,751,143
ELECTRICAL CABLES
Filed Dec. 15, 1926
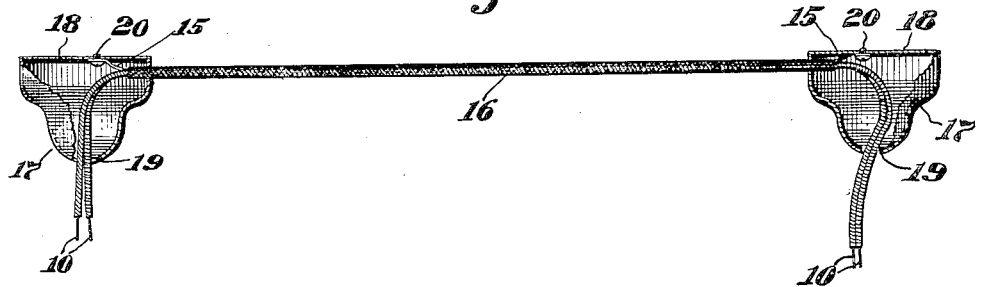
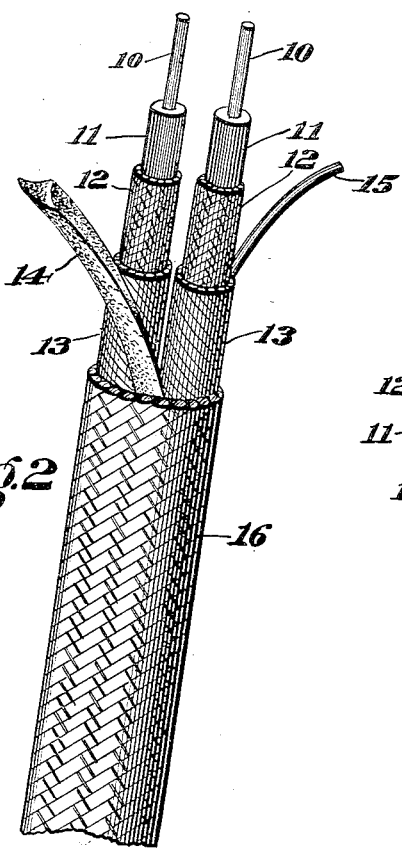
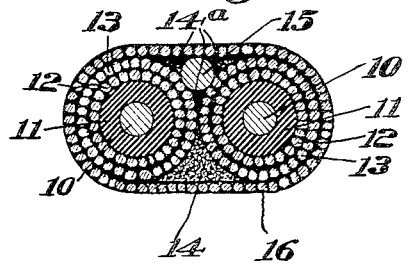
INVENTOR:
Otto A. Frederickson
BY Rob. O. Harris
ATTORNEY Patented Mar. 18, 1930

1,751,143

UNITED STATES PATENT OFFICE

OTTO A. FREDERICKSON, OF WETHERSFIELD, CONNECTICUT, ASSIGNOR TO THE WIRE-MOLD COMPANY, OF HARTFORD, CONNECTICUT, A CORPORATION OF CONNECTICUT

ELECTRICAL CABLES

Application filed December 15, 1926. Serial No. 154,912.

This invention relates to non-metallic sheathed cables adapted for use in wiring buildings and for other purposes.

In wiring buildings for the use of an electric current and in the installation of various electrical devices it is important that the conductor wires be well insulated electrically and well protected against mechanical injury, and it is highly desirable that the electrical cables when installed shall serve to form a ground connection between the various outlet boxes.

It has been the general practice heretofore, in wiring buildings, to incase the insulated conductor wires in flexible metallic sheaths, or to install the wires in metal pipes. These metallic sheaths and metal pipes when properly installed form the desired ground connection between the various outlet boxes, but the metal conduits or pipes are expensive to install, and the flexible metallic sheaths are open to the objection that they are formed of a spirally wound metal strip which when crushed is likely to cut the insulation upon the conductor wires and short-circuit the wires.

It has therefore been proposed heretofore to employ non-metallic sheathed cables in wiring buildings wherein the insulated conductor wires are enclosed and united by a non-metallic outer jacket. These non-metallic sheathed cables when properly constructed afford good protection for the conductor wires both mechanically and electrically, and are highly desirable in many respects; but they are open to the objection that they do not form a ground connection between the outlet boxes to which they are secured.

Having the foregoing in mind the present invention relates to non-metallic sheathed cables which while possessing the advantages of the non-metallic sheathed cables proposed heretofore, serve also to form a ground connection between the outlet boxes to which the cables are connected.

A good practical form of non-metallic sheathed cable proposed heretofore consists of a pair of conductor wires each of which is provided with one or more layers of insulating materials, and these conductors are laid side by side so that a valley is formed at each side of the pair of wires, and in each valley is laid a filler to fill out the same. About the construction just described is provided a non-metallic outer jacket which encloses and protects the insulated conductors.

The cable construction just described may well be employed in carrying out the present invention since the desired ground between the different electrical devices may be secured by laying a ground wire in one of the valleys so that the ends of the ground wire may be secured to the outlet boxes or other devices connected by the non-metallic sheathed cable.

The various features of the present invention and novel arrangement of parts will be best understood from the following description when read in connection with the accompanying drawings showing one good practical form of the invention.

In the drawings:—

Fig. 1 is a sectional view through two outlet boxes connected by a cable constructed in accordance with the present invention;

Fig. 2 on an enlarged scale is a perspective view of a piece of the cable shown in Fig. 1, the covering sheaths being progressively removed; and Fig. 3 is a transverse sectional view through the cable of Fig. 2;

The electrical cable shown in the drawings is provided with two metallic conductors 10, but the ground wire feature of the present invention may be employed in cables provided with more than two insulated conductor wires.

The insulating covering for each of the conductors 10 may be variously constructed, and as shown each wire 10 has a rubber jacket 11 over which is placed a braided covering 12, and about this covering is wound a wrapper 13. The insulated conductors thus formed are laid side by side as shown so that a valley is formed at each side of the pair of conductors, and in one of the valleys is laid a filler 14 preferably formed of a large soft cord or strand which will conform to the shape of the valley as shown.

In the opposite valley, in accordance with the present invention, is laid a ground wire 15 which may or may not be covered with insulating material, but is shown as uncovered.

The construction so far described is enclosed in the outer jacket 16 which protects and unites the conductors and holds the filler 14 and ground wire 15 in the valleys. The spaces formed about the ground wire 15 within the valley are preferably filled with a suitable compound 14ª. The outer jacket 16 is shown as having a braided construction but may be otherwise formed.

In Fig. 1 is shown a pair of outlet boxes 17 of any well known or desired construction for installation in buildings, and each box has a metal base or floor plate 18. The boxes 17 may serve to house any electric fixture which is to be supplied with current by the conductor wires 10, or these wires may simply pass downwardly through the opening 19 of each box in order that an electric light, or other electrical device may be secured to the suspended wires 10.

In order to form the desired ground connection between the outlet boxes or fixtures 17, the opposite ends of the ground wire 15 are secured to the base plates 18 or any other portion of the boxes 17 by suitable means such as the fastening screws 20. As a result of the novel construction just described a ground connection between the outlet boxes is formed which is as good if not better than the ground connections provided heretofore through the use of armored cables the outer metallic jackets of which were electrically connected to the outlet boxes. Furthermore, since the ground wire lies within the outer jacket 16 it is insulated and electrically protected throughout its length from electrical conductors or other objects with which the outer jacket 16 of the cable may contact.

What is claimed is:—

1. In combination with electrical outlet boxes mounted in spaced relation to each other, an electrical cable extending between said boxes and provided with conductor wires that extend into said boxes and which are insulated from each other and from the boxes, a ground wire extending along said conductor wires and electrically connected to the boxes to form a ground between the boxes, and a non-metallic outer jacket enclosing the conductor wires and ground wire and adapted to insulate and electrically protect the ground wire.

2. In combination with electrical outlet boxes or fixtures mounted in spaced relation to each other, an electrical cable extending between said boxes or fixtures and provided with a pair of conductor wires that extend into the boxes or fixtures and which wires are insulated from each other and from the boxes or fixtures, a ground wire extending along said conductor wires and electrically connected to said boxes or fixtures to form a ground therebetween, and a non-metallic outer jacket enclosing the insulated conductor wires and ground wire and adapted to insulate and electrically protect the ground wire.

3. In combination with electrical outlet boxes or fixtures mounted in spaced relation to each other, an electrical cable extending between said boxes or fixtures and provided with a pair of conductor wires that extend into the boxes or fixtures and which wires are insulated from each other and from the boxes or fixtures, a filler strip laid in the valley formed at one side of the insulated conductors, a ground wire laid in the valley formed at the opposite side of the conductors and electrically connected to said boxes or fixtures to form a ground therebetween, and a non-metallic outer jacket enclosing the insulated conductors and ground wire and adapted to insulate and electrically protect the ground wire.

In testimony whereof, I have signed my name to this specification.

OTTO A. FREDERICKSON.